(12) United States Patent
Esquivias et al.

(10) Patent No.: US 11,649,072 B1
(45) Date of Patent: May 16, 2023

(54) POWER PROCESSING UNIT (PPU) AND ELECTRIC PROPULSION SYSTEM (EPS) FOR SPACECRAFT

(71) Applicant: Maxar Space LLC, Palo Alto, CA (US)

(72) Inventors: Jason Esquivias, Aurora, CO (US); Giovanni Lenguito, New York, NY (US)

(73) Assignee: Maxar Space LLC, Pato Alto, CA (US)

( * ) Notice: Subject to any disclaimer, the term of this patent is extended or adjusted under 35 U.S.C. 154(b) by 0 days.

(21) Appl. No.: 17/737,432

(22) Filed: May 5, 2022

(51) Int. Cl.
*B64G 1/40* (2006.01)
*B64G 1/42* (2006.01)

(52) U.S. Cl.
CPC ............ *B64G 1/405* (2013.01); *B64G 1/402* (2013.01); *B64G 1/428* (2013.01)

(58) Field of Classification Search
CPC ........ B64G 1/402; B64G 1/405; B64G 1/406; B64G 1/428; F03H 1/0006; F03H 1/0018; F03H 1/0062; F03H 1/0075
See application file for complete search history.

(56) References Cited

U.S. PATENT DOCUMENTS

| | | | | |
|---|---|---|---|---|
| 4,638,149 | A * | 1/1987 | Wessel | G05F 3/04 323/361 |
| 6,031,334 | A * | 2/2000 | Meyer | F03H 1/0018 60/202 |
| 7,579,780 | B2 * | 8/2009 | Tamida | H05H 7/00 315/111.41 |
| 8,024,917 | B2 * | 9/2011 | Hruby | F03H 1/0018 60/202 |
| 10,718,319 | B2 * | 7/2020 | Brotons | F03H 1/0018 |
| 10,969,811 | B1 * | 4/2021 | Polyakov | H02M 3/335 |
| 2017/0210493 | A1 * | 7/2017 | Marchandise | B64G 1/26 |
| 2017/0305579 | A1 | 10/2017 | Lu | |

(Continued)

OTHER PUBLICATIONS

Malone, Shane, et al., "Deep Space Power Processing Unit for the Psyche Mission," IEPC-2019-A280, International Electric Propulsion Conference, Sep. 2019, 18 pages.

(Continued)

*Primary Examiner* — Loren C Edwards
(74) *Attorney, Agent, or Firm* — Vierra Magen Marcus LLP (57) ABSTRACT

Described herein is a power processing unit (PPU) for use with a Hall Effect Thruster (HET) and a Propellant Management Assembly (PMA) of a spacecraft. The PPU comprises an anode and ignitor supply subsystem that provides anode and ignitor signals to an anode and an ignitor circuit of the HET. The PPU also comprises a valve control subsystem that provides valve control signal(s) to valve(s) of the PMA. The anode and ignitor supply subsystem and the valve control subsystem are each coupled to a low voltage (LV) bus of an electrical power subsystem of the spacecraft. The anode and ignitor supply subsystem includes a step-up DC-DC converter having a transformer that steps-up a voltage of the LV bus to a higher voltage used to produce the anode and ignitor signals. The valve control subsystem is devoid of a transformer. An Electric Propulsion System (EPS) includes the PPU, HET and PMA.

20 Claims, 6 Drawing Sheets

(56) References Cited

U.S. PATENT DOCUMENTS

2020/0198807 A1  6/2020  Mansour et al.

OTHER PUBLICATIONS

Clayton, Paul, et al., "High Efficiency, Versatile Power Processing Units for Hall-Effect Plasma Thrusters," AIAA 2018-4642, Session: EP Flight Programs and Missions I, published online on Jul. 8, 2018, [https://doi.org/10.2514/6.2018-4642], 7 pages.

* cited by examiner

POWER PROCESSING UNIT (PPU) AND ELECTRIC PROPULSION SYSTEM (EPS) FOR SPACECRAFT

BACKGROUND

Spacecraft, such as satellites, shuttles, space stations, inter-planet traveling crafts, and rockets, often have an electric propulsion system (EPS) that includes a power processing unit (PPU), an electrical thruster (e.g., a Hall Effect Thruster), and a propellant management assembly (PMA).

Conventionally a PPU is designed to support a specific model of electrical thruster, e.g., a specific model of a Hall Effect Thruster (HET), and a specific model of a PMA. Thus, whenever a new or different model of an HET is selected for inclusion on a spacecraft, a custom PPU is typically designed by a specific vendor for the spacecraft. This results in the spacecraft manufacturer being vendor locked to a specific HET and/or a specific PPU. It would be beneficial if a PPU's design was such that the PPU can be used with HETs and PMAs produced by various different vendors, so that a spacecraft manufacturer is not vendor locked to a specific HET made by a specific vendor, nor a specific PMA made by a specific vendor. Additionally, it would be beneficial if a PPU could be designed to have a reduced quantity of parts, a reduced cost, a reduced weight and/or a reduced size, to thereby reduce the overall number of parts, cost, weight and/or size of the spacecraft that will include the PPU. It would also be beneficial if a PPU could be made less complex and more reliable.

BRIEF SUMMARY

Certain embodiments of the present technology are directed to a power processing unit (PPU) configured for use with a Hall Effect Thruster (HET) and a Propellant Management Assembly (PMA) of a spacecraft, wherein the HET is configured to propel the spacecraft using a propellant provided to the HET by the PMA. In accordance with certain embodiments, the PPU comprises an anode and ignitor supply subsystem configured to provide an anode signal and an ignitor signal, respectively, to an anode and an ignitor circuit of the HET. The PPU also comprises a valve control subsystem configured to provide one or more valve control signals to one or move valves of the PMA. Each of the anode and ignitor supply subsystem and the valve control subsystem of the PPU is configured to be coupled to a low voltage (LV) bus of an electrical power subsystem of the spacecraft. The anode and ignitor supply subsystem includes a step-up direct current to direct current (DC-DC) converter having a transformer that steps-up a voltage of the LV bus to a higher voltage that is used to produce the anode signal and the ignitor signal that are configured to be provided, respectively, to the anode and the ignitor circuit of the HET. By contrast, the valve control subsystem is devoid of a transformer.

In accordance with certain embodiments, a voltage produced at an output of the step-up DC-DC converter of the anode and ignitor supply subsystem is used to produce both the ignitor signal and the anode signal that are configured to be provided, respectively, to the ignitor circuit and the anode of the HET.

In accordance with certain embodiments, the ignitor signal includes ignitor pulses that are configured to be used to ignite the HET, wherein a voltage of each of the ignitor pulses of the ignitor signal is a same as a voltage of the anode signal. In accordance with certain embodiments, the anode and ignitor supply subsystem includes an ignitor switch that receives the voltage produced at the output of the step-up DC-DC converter of the anode and ignitor supply subsystem and produces the ignitor pulses therefrom. In accordance with certain embodiments, the ignitor switch includes a current limiting circuit that is configured to maintain a current of the ignitor signal below a specified upper limit.

In accordance with certain embodiments, the PPU also comprises a flow control subsystem configured to provide a flow control signal to a flow control device of the PMA, wherein the flow control subsystem includes a step-down DC-DC converter that steps-down the voltage of the LV bus to a lower voltage that is used to produce the flow control signal that is configured to be provided to the flow control device of the PMA, and wherein the step-down DC-DC converter of the flow control subsystem is devoid of a transformer.

In accordance with certain embodiments, the PPU further comprises a heater supply subsystem configured to provide a heater control signal to a heater of the HET that is configured to heat a cathode of the HET, wherein the heater supply subsystem is configured to be coupled to the LV bus of the spacecraft electrical power subsystem, and wherein the heater supply subsystem is devoid of a transformer. In accordance with certain embodiments, the heater supply subsystem includes one or more magnetic switches and one or more relays that enable the heater of the HET to be selectively electrically isolated from the LV bus of the spacecraft electrical power subsystem without use of a transformer.

In accordance with certain embodiments, the PPU also comprises a command and telemetry subsystem configured to receive commands from a processor of the spacecraft, and in response thereto control the anode and ignitor supply subsystem and the valve control subsystem of the PPU. Additionally, the command and telemetry subsystem can be configured control the flow control subsystem of the PPU. The command and telemetry subsystem can also be configured to control the heater supply subsystem of the PPU.

In accordance with certain embodiments, the PPU further comprises a housekeeping power supply subsystem configured to power electrical components of the PPU, wherein the housekeeping power supply subsystem is configured to be coupled to the LV bus of the spacecraft electrical power subsystem, and wherein the housekeeping power supply subsystem does not provide any signals to the HET and the PMA.

Certain embodiments of the present technology are directed to an electric propulsion system (EPS) for inclusion on a spacecraft, wherein the EPS comprises a Power Processing Unit (PPU), a Hall Effect Thruster (HET), and a Propellant Management Assembly (PMA). The PPU is configured to be coupled to a low voltage (LV) bus of an electrical power subsystem of the spacecraft. The PPU comprises an anode and ignitor supply subsystem and a valve control subsystem. The anode and ignitor supply subsystem includes step-up DC-DC converter having a transformer that is used to produce both an anode signal and an ignitor signal that are output by the PPU. The valve control subsystem is devoid of a transformer and is configured to produce one or more valve control signals that are output by the PPU. The HET comprises an anode and an ignitor circuit that receive, respectively, the anode signal and the ignitor signal from the PPU, which are used to selectively ignite the HET. The PMA includes one or more valves each of which receives a respective one of the one or more valve control signals from the PPU, which are used to selectively open and close the one or more valves to thereby selectively provide propellant to the HET. In accordance with certain embodiments, components of the HET and the PMA, other than the anode and the ignitor circuit of the HET, are configured to operate at a voltage of the LV bus or one or more stepped-down versions thereof.

In accordance with certain embodiments, a voltage produced at an output of the step-up DC-DC converter of the anode and ignitor supply subsystem is used to produce both the ignitor signal and the anode signal that are provided, respectively, to the ignitor circuit and the anode of the HET. In accordance with certain embodiments, the ignitor signal includes ignitor pulses that are used to ignite the HET, wherein a voltage of each of the ignitor pulses of the ignitor signal is a same as a voltage of the anode signal. In accordance with certain embodiments, the anode and ignitor supply subsystem includes an ignitor switch that receives the voltage produced at the output of the step-up DC-DC converter of the anode and ignitor supply subsystem and produces the ignitor pulses therefrom. In accordance with certain embodiments, the ignitor switch includes a current limiting circuit that is configured to maintain a current of the ignitor signal below a specified upper limit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
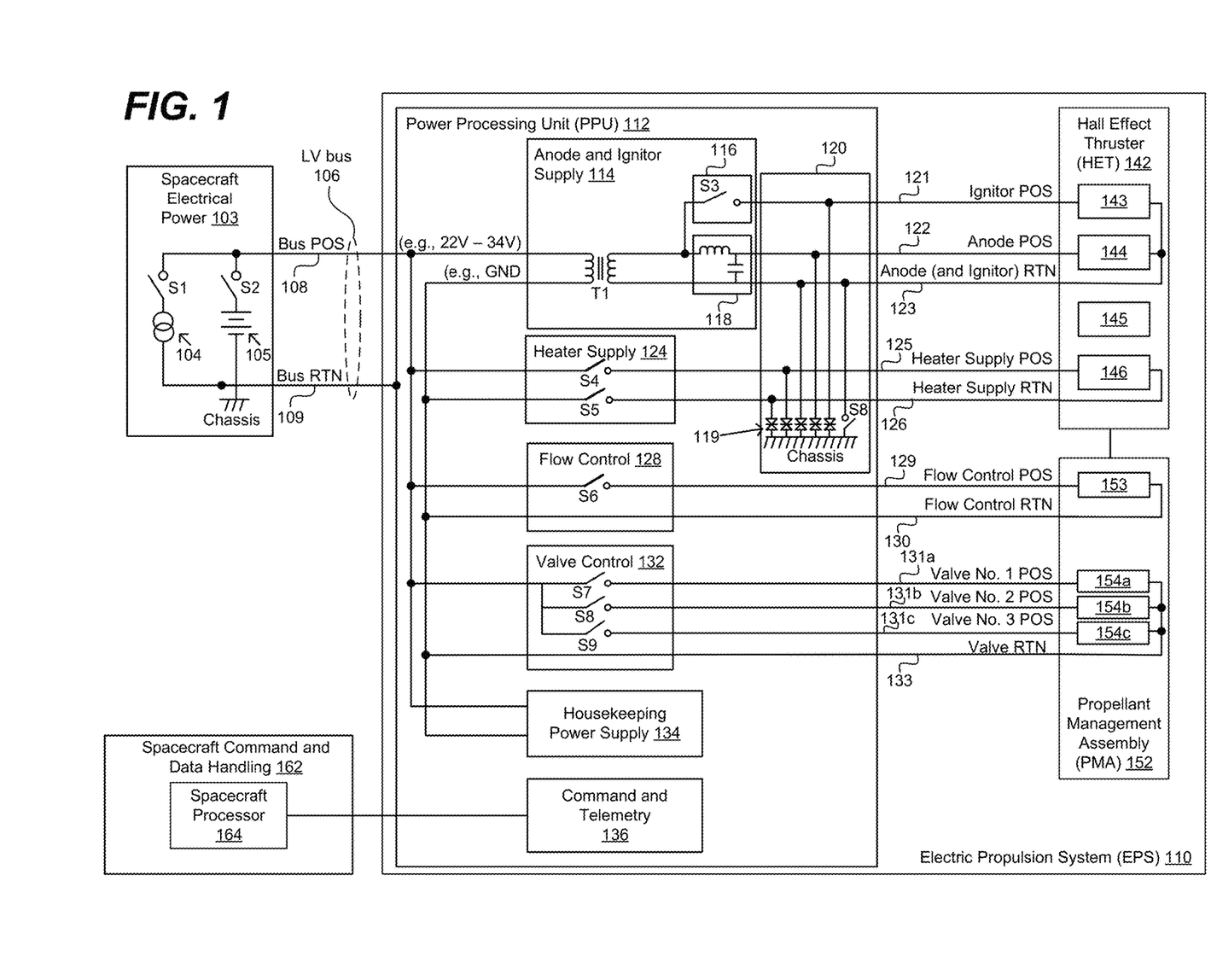
FIG. 1 shows a power processing unit (PPU) of an electronic propulsion system (EPS), according to an embodiment of the present technology.

FIG. 1 shows a simplified power processing unit (PPU) 112, according to an embodiment of the present technology. The PPU 112 is configured for use with a Hall Effect Thruster (HET) 142 and a Propellant Management Assembly (PMA) 152 of a spacecraft. The PPU 112, the HET 142 and the PMA 152 are parts of an electric propulsion system (EPS), according to an embodiment of the present technology. The HET 142 is configured to propel the spacecraft using a propellant provided to the HET 142 by the PMA 152. The PPU 112 is responsible for operating the HET 142.

The PPU 112 is shown as including various different subsystems, which can also be referred to as modules. More specifically, the PPU 112 is shown as including an anode and ignitor supply subsystem 114, a heater supply subsystem 124, a flow control subsystem 128, and a valve control subsystem 132. The PPU is also shown as including a housekeeping power supply subsystem 134 and a command and telemetry subsystem 136. Each of the aforementioned subsystems is described in additional detail below. Conventionally, a plurality of the subsystems of a PPU that provides signals to an HET and PMA would each have its own DC-DC converter having a respective transformer, which adds size, weight, complexity and expense to the PPU.

Still referring to FIG. 1, the PPU 112 is shown as receiving power from a low voltage (LV) bus 106, which includes a positive (POS) bus line 108 and a return (RTN) bus line 109. In accordance with certain embodiments, a voltage of the bus POS line 108 is a low voltage within the range of 20 to 70 Volts (V), and in specific embodiments, is within the range of 22 to 34 V. For an example, the voltage of the bus POS line 108 is 28 V. The bus RTN line 109 is at a voltage that is lower than the bus POS line 108, and in specific embodiments is at ground (GND), wherein the GND can be provided by a chassis of a spacecraft that includes the PPU 112. The LV bus 106 (which can also be referred to herein as the spacecraft power bus 106, the spacecraft bus 106, or the power bus 106) receives power from a spacecraft electrical power subsystem 103.

The spacecraft electrical power subsystem 103 includes a solar array 104 that is used to charge a battery 105, and thus, the battery 105 can also be referred to herein as a solar panel charged battery 105. A switch 51 is used to selectively connect and disconnect the solar array 104 from the bus POS line 108, and a switch S2 is used to selectively connect and disconnect the battery 105 from the bus POS line 108. While not specifically shown in FIG. 1, the spacecraft electrical power subsystem 103 can also include other components, such as a power control and distribution unit (PCDU), but not limited thereto.

Conventionally, subsystems (also known as modules) of a PPU that are configured to provide signals to an HET and a PMA of a spacecraft typically include multiple DC-DC converters each having its own a respective transformer. For example, an ignitor supply subsystem of a conventional PPU typically has its own step-up DC-DC converter having a respective transformer for providing a signal to an ignitor circuit of a HET, while an anode supply subsystem of the conventional PPU also typically includes its own step-up DC-DC converter having its own respective transformer for providing a signal to an anode of the HET. Additionally, other subsystems (e.g., a heater supply subsystem, a flow control subsystem, and a valve control subsystem) of a conventional PPU also typically each include its own respective DC-DC converter having its own respective transformer. The inclusion of numerous transformers within the subsystems of a convention PPU (that provide signals to an HET and a PMA) add to the complexity the and cost of the conventional PPU, and reduce the reliability of the conventional PPU, since transformers are complex and often have reliability issues.

In accordance with the embodiment of FIG. 1, rather there being a separate anode supply subsystem (that provides a signal to an anode of the HET) and a separate ignitor supply subsystem (that provides a signal to an ignitor circuit of an HET), with each of these subsystems including their own respective DC-DC converter having their own respective transformer, these two aforementioned subsystems are combined within the PPU 112 into an anode and ignitor supply subsystem 114 that include a single DC-DC converter having a respective transformer. More generally, the subsystems of the PPU 112 in FIG. 1 that are configured to provide signals to the HET 142 and the PMA 152 of the PPU 112 include a single step-up DC-DC converter having a transformer, wherein the single step up DC-DC converter having the transformer is part of the anode and ignitor supply subsystem 114, as will be described below. The other subsystems of the PPU 112 that provide signals to the HET 142 and PMA 152, such as the heater supply subsystem 124, the flow control subsystem 128, and the valve control subsystem 132, use the low voltage signal provided by the LV bus 106 (or stepped-down versions thereof) to power and control components of the HET 142 and the PMA 152, and do not include their own respective transformers, as will be described below. This reduces the quantity and cost of components of the PPU 112, as well as reduces the size and weight of the PPU 112, compared to if one or more of the heater supply subsystem 124, the flow control subsystem 128, and the valve control subsystem 132 included its own respective step-up DC-DC converter having its own respective transformer. Additionally, because transformers typically add complexity and have reliability issues, the PPU 112 is less complex and more reliable than a conventional PPU.

The anode and ignitor supply subsystem 114, which can also be referred to as the anode and ignitor supply module 114, is shown as including a transformer T1, which is part of a step-up direct current to direct current (DC-DC) converter that is used to step up the voltage of the LV bus 106 to a high voltage (HV) within the range of 150 V to 800 V, and in specific embodiments, to about 300 V. The anode and ignitor supply subsystem 114 is also shown as including an ignitor switch 116 and an oscillation filter 118, and a portion of a float clamp and relay subsystem 120. The ignitor switch 116 can also be referred to as the switch S3. The anode and ignitor subsystem 114 is used to provide an ignitor POS line 121, an anode POS line 122 and an anode RTN line 123 to the HET 142 that is powered by the PPU 112. The RTN line 123 is also the Ignitor RTN line, since both are connected together internal to the HET 142. The ignitor POS line 121 is used to provide an ignitor signal to the HET ignitor 143. The anode POS line 122 is used to provide an anode signal to the anode 144. Each of the ignitor signal and the anode signal has a respective voltage and current that varies over time, under the control of the PPU 112, as can be appreciated from the timing and waveform diagram of FIG. 6 discussed below. Additional details of the anode and ignitor supply subsystem 114, according to an embodiment of the present technology, are provided below with reference to FIG. 2.

Still referring to FIG. 1, the HET 142 is a type of electrical thruster for spacecraft that operates on a propellant, such as xenon, to accelerate ions up to high speeds to produce thrust for maneuvering the spacecraft. Other types of propellants that may be used by the HET 142 include, for example, krypton, argon, bismuth, iodine, magnesium, zinc and adamantane, but are not limited thereto. Such a propellant, which can also be referred to as an accelerant, is provided to the HET 142 by the PMA 152, which is discussed in further detail below. For the remainder of the disclosure, unless stated otherwise, it is assumed that the propellant used by the HET 142 is xenon.

The HET 142 includes an HET ignitor circuit 143, an HET anode 144, an HET cathode 145 and a cathode heater 146. The HET 142 can also include other elements not shown. It is possible that the HET 142 need not include a cathode heater 146, depending upon the specific implementation, in which case the PPU 112 need not include the heater supply subsystem 124. The HET ignitor circuit 143 (which can also be referred to as the HET ignitor 143, the ignitor circuit 143, or the simply the ignitor 143) is responsive to a pulsed HV signal received from the ignitor switch 116, and is used to ignite the propellant (e.g., xenon) that is provided to the HET 142 by the PMA 152. The anode POS line 122 and the anode RTN line 123 provide a HV electric potential (e.g., between 150 and 800 V) between the anode 144 and the cathode 145. The propellant, e.g., xenon gas, is fed through the anode 144, which has numerous small holes in it to act as a gas distributor. As neutral xenon atoms diffuse into a channel of the thruster, they are ionized by collisions with circulating high-energy electrons, which causes most of the xenon atoms to be ionized. The xenon ions are then accelerated by the electric field between the anode 144 and the cathode 145. This results in an orbital rotation of electrons, which is a circulating Hall current, and it is from this that the Hall Effect Thruster gets its name. Collisions with other particles and walls, as well as plasma instabilities, allow some of the electrons to be freed from the magnetic field, and they drift towards the anode 144. More generally, the anode and ignitor supply subsystem 114 provides an anode signal and an ignitor signal to the HET 142, which are used to ignite the HET 142.

While not specifically shown in FIG. 1, the HET 142 can include a channel with the anode 144 situated at an end of the channel, the cathode 145 situated downstream from the channel and fitted with the heater 146. Electromagnets (not shown in FIG. 1) can be situated radially inside and outside the channel, and propellant fluid injectors (not shown) can be situated at the upstream end of the channel. While not specifically shown in FIG. 1, it is possible that the PPU 112 includes a magnet that is for use with the HET 142. In certain embodiments, the PPU 112 does not include a magnet, thereby further simplifying the PPU 112. Rather, the HET 142 can have its own permanent magnet, or an electromagnet of the HET 142 can operate off anode current.

In certain embodiments, fuses that are used to protect the PPU 112 and the HET 142 and the spacecraft electrical power subsystem 103 with which the PPU 112 is being used, are provided external to the PPU 112, e.g., as part of a PCDU that is coupled between the battery 105 and the PPU 112. In other embodiments, the fuses can be part of the PPU 112. Examples of such fuses include the fuses F1, F2, and F3 shown in FIGS. 3, 4 and 5.

The heater 146, which is used to heat up the HET cathode 145, can include a resistive heater element that is heated up in response to a signal provided to the heater 146 from the LV bus 106. The heater supply subsystem 124 of the PPU 112, includes switches S4 and S5, to selectively connect and disconnect the bus POS line 108 and the bus RTN line 109, of the LV bus 106, respectively to a heater supply POS line 125 and a heater supply RTN line 126. More generally, the heater supply subsystem 124, which can also be referred to as the heater supply module 124, is used to provide the voltage level of the LV bus 106 (or a stepped down version thereof) as a heater control signal to the heater 146 of the HET 142. Additional details of the heater supply subsystem 124, according to an embodiment of the present technology, are provided below with reference to FIG. 3.

In FIG. 1, the PMA 152 includes a flow control device 153 and valves 154a, 154b, and 154c. The flow control device 153 is coupled between a flow control POS line 129 and a flow control RTN line 130 and selectively provides propellant to the HET 142, under the control of the flow control subsystem 128. The flow control subsystem 128 is controlled by the command and telemetry subsystem 130, which is discussed in more detail below. The flow control device 153 is used to control the flow of propellant gas (e.g., xenon) that is provided to the HET 142. Additional details of the flow control subsystem 128, according to an embodiment of the present technology, are provided below with reference to FIG. 4.

The valves 154a, 154b, and 154c can be referred to collectively as the valves 154, or individually as a valve 154. While three valves 154 are shown in FIG. 1, the PMA 152 can include less or more than three valves 154, and more generally, can include one or more valves 154. Each of the valves 154a, 154b, 154c can be selectively and individually turned on or off. In certain embodiments, one of the valves 154 is used to selectively control when propellant is provided to the anode 144, while another one of the valves 154 is used to selectively control when propellant is provided to the cathode 145. Each of the valves 154a, 154b, 154c is shown as being coupled between a respective valve POS line 131a, 131b, 131c and a common valve RTN line 133. The valve POS lines 131a, 131b, 131c can be referred to collectively as the valve POS lines 131, or individually as a valve POS line 131. The one or more valves 154 are each selectively opened and closed under the control of the valve control subsystem 132. The valve control subsystem 132 is controlled by the command and telemetry subsystem 130, which is discussed in more detail below. Additional details of the valve control subsystem 132, according to an embodiment of the present technology, are provided below with reference to FIG. 5.

It is possible that the PMA 152 can include one or more valves 154, without including a flow control device 153, in which case the PPU 112 need not include a flow control subsystem 128. In other words, in an alternative embodiment where the PMA 152 is devoid of the flow control device 153, the PPU 112 is devoid of the flow control subsystem 128.

In certain embodiments, the PPU 112 includes a float clamp and relay subsystem 120 that includes transorbs coupled between various output lines of the PPU 112 and a chassis of the spacecraft that includes the PPU 112, wherein each transorb (which is also known as a transient voltage suppressor) is a Zener diode engineered for high power current switching. Each such transorb functions in a similar fashion to a field effect transistor (FET), but is capable of handling higher current and voltages than a FET. In specific embodiments, each of the transorbs consists of two Zener diodes so that the transorb is "bidirectional" in that it allows current flow in two directions, unlike a FET or diode that only allows current flow in one primary direction. In the embodiment of FIG. 1, the float clamp and relay subsystem 120 is shown as including a switch S8, which can be implemented as a relay, which is used to selectively couple the anode RTN line 123 (which is also the ignitor RTN line) to the chassis of the spacecraft, which functions as the GND.

The housekeeping power supply subsystem 134, which is coupled to the LV bus 106, does not provide any signals to the HET 142 and the PMA 152. Rather, the housekeeping power supply subsystem 134 generates one or more stepped-down versions of the LV signal (e.g., 28 V) provided by the bus POS line 108, to thereby power components of (i.e., internal to) the PPU 112. For example, the housekeeping power supply subsystem 134 can receive the LV signal (e.g., 28 V) provided by the bus POS line 108, and based thereon, can produce a 5 V signal that is used to power a microcontroller of the command and telemetry subsystem 136, and a 3.3 V signal that is used to power an amplifier (e.g., amplifier 412 in FIG. 4) of one of the other subsystem, but is not limited thereto. It is possible that the housekeeping power supply subsystem 134 includes a DC-DC converter having a respective transformer, e.g., to enable the ignitor switch 116 (also referred to as the switch S3) to be controlled. Such a transformer of the housekeeping power supply subsystem 134 can be used to isolate and reference the LV signal (e.g., 28 V) provided by the bus POS line 108 (or a stepped-down version thereof) to a higher voltage that is used to selectively turn on (i.e., close) the ignitor switch 116.

The command and telemetry subsystem 136 receives commands from a spacecraft processor 164 of a spacecraft command and data handling subsystem 162, and based thereon, generates digital commands and analog commands that are used to control other subsystems of the PPU 112. For example, the command and telemetry subsystem 136 can produce an Ignitor Enable signal that is provided to a pulse driver (e.g., 224 in FIG. 2) of the ignitor switch 116, a valve On/Off signal that is provided to a gate drive circuit (e.g., 502 in FIG. 5) of the valve control subsystem 132. The command and telemetry subsystem 136 can also produce a Duty Cycle Control signal and a Heater Isolation Control signal (discussed below with reference to FIG. 3) that are provided to the heater supply subsystem 124. Other variations are also possible and within the scope of the embodiments described herein. The command and telemetry subsystem 136 can additionally monitor and store information about how much input power the PPU 112 draws from the spacecraft electrical power subsystem 103, how much output voltage and output current is provided to the HET 142, the states of the valves 154, at various different times, but is not limited thereto.

In accordance with certain embodiments of the present technology, components of the HET 142, other than the ignitor circuit 143 and anode 144, and components of the PMA 152 are selected and/or designed to be powered by signals that are at the voltage level provided by the LV bus 106, or stepped-down versions thereof. This beneficially minimizes how many step-up DC-DC converters having a respective transformer need to be included within the PPU 112, or more generally, within the EPS 110.

Figure 2:
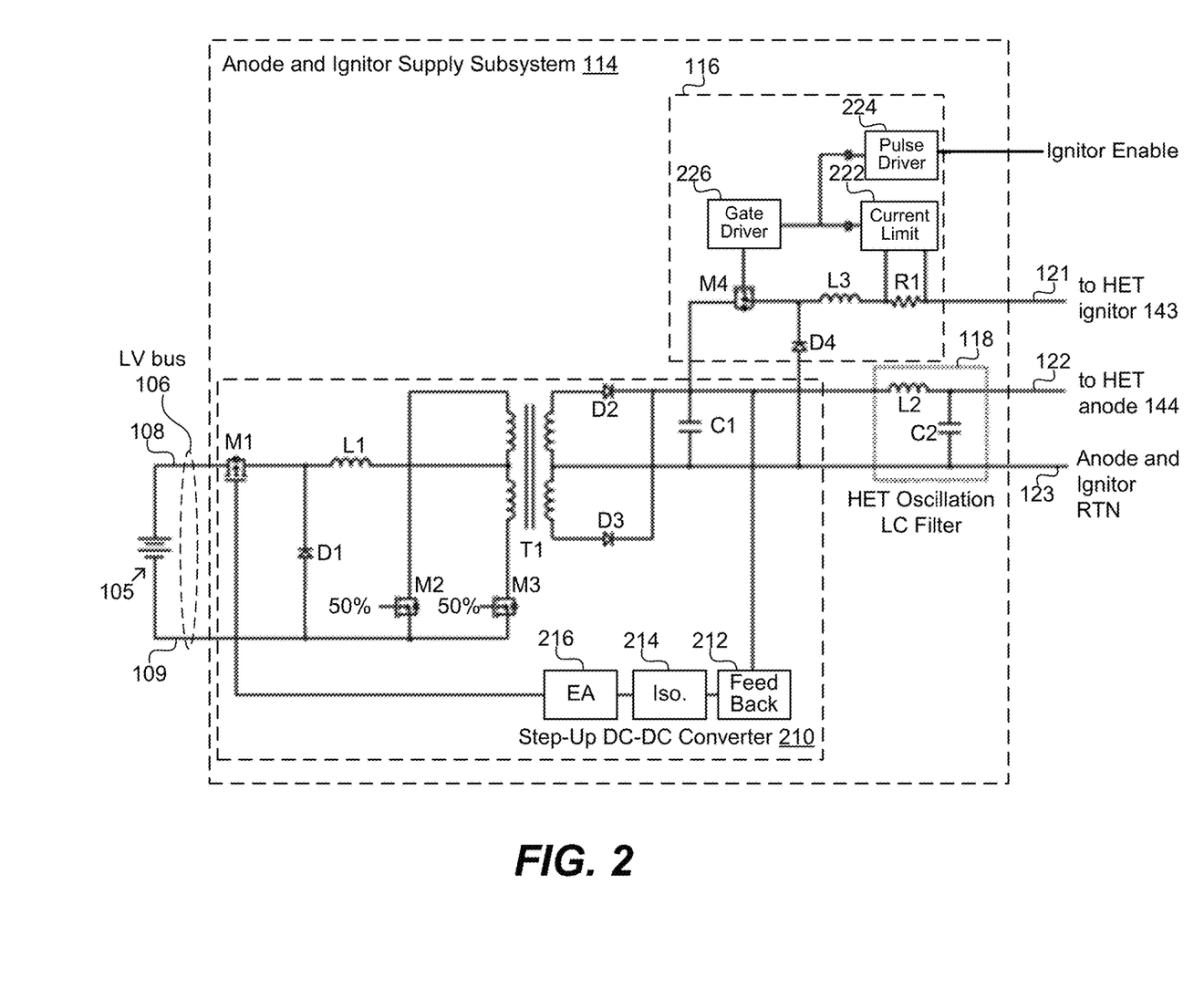
FIG. 2 shows details of the anode and ignitor supply subsystem of the PPU introduced in FIG. 1, according to an embodiment of the present technology.

FIG. 2 shows details of the anode and ignitor supply subsystem 114 of the PPU 112 introduced in FIG. 1, according to an embodiment of the present technology. The anode and ignitor supply subsystem 114 includes a step-up DC-DC converter 210 responsible for taking the low voltage level (e.g., 28 V) of the spacecraft bus 106 as an input and generating a high voltage (HV) high power output, wherein the HV power output (e.g., 300 V) is used to power the anode 144 and ignitor 143 elements of the HET 142, with the HV power output being within the range of 150 V to 800 V. In accordance with certain embodiments, the PPU 112 can be driven at anode powers up to 500 W.

In FIG. 2, the step-up DC-DC converter of the anode and ignitor supply subsystem 114 is implemented as an isolated current-fed push-pull topology, which step-ups the voltage of the LV bus 106 (e.g., 28 V) to the HV power output (e.g., 300 V). While a specific step-up DC-DC conversion topology is shown, the use of other topologies to generate the HV power output are also within the scope of the embodiments described herein.

The LV voltage (e.g., 28 V) of the LV bus 106 from the spacecraft electrical power subsystem 103 (in FIG. 1) is used as the input voltage into the step-up DC-DC converter of the anode and ignitor supply subsystem 114. There are three transistor switching devices M1, M2 and M3, a diode D1, an inductor L1 and the primary windings of the transformer T1 present in the input stage of the step-up DC-DC converter. The two bottom switches M2 and M3 (shown as MOSFETs) are operated at a 50% duty cycle, 180 degrees out of phase with one another. This action repeatedly generates the push-pull action on the primary windings of the transformer T1 and transforms the voltage at the node between the transformer primary windings and the inductor L1 to the secondary windings by a fixed ratio. The ratio is determined by the number of turns in the primary and secondary windings of the transformer T1. The number of turns in the windings are determined in the design stage to set the maximum attainable anode voltage, or more generally, to achieve a desired anode voltage.

The transistor switch M1 (shown as a MOSFET), the inductor L1, the diode D1 and the primary windings of the transformer T1 form the input stage of the step-up DC-DC converter of the anode and ignitor supply subsystem 114. The action of the upper switch M1 repeatedly opening and closing generates voltages pulses at the input of the inductor L1 that the inductor L1 then averages to generate a lesser voltage (aka stepped-down voltage) to feed into the primary windings of the transformer T1. The diode D1 allows current to continue flowing through the inductor L1 during periods of the switching cycle when the transistor switch M1 is in the closed position. The duty cycle and frequency of the transistor switch M1 is controlled by an error amplifier (EA) 216.

An output stage of the DC-DC converter of the anode and ignitor supply subsystem 114 is where the HV power output is first generated. The output stage is made up of the secondary windings of the transformer T1, two power rectifier diodes D2 and D3 and a bulk capacitance C1. The bulk capacitance C1 can be provided by one or more capacitors (e.g., multiple capacitors connected in series and/or parallel). The push-pull action on the primary (input stage) windings of the transformer T1 generates an alternating voltage on the output windings of the transformer T1. In each alternate cycle, only one of the power rectifiers D2, D3 becomes forward biased and allows energy transferred by the primary to secondary windings of the transformer T1 to charge up the bulk capacitance C1 in the form of current pulses. On the next cycle, the other one of the power rectifiers D2, D3 is used to charge up the bulk capacitance C1. The high voltage across the bulk capacitance C1 is regulated by the EA 216 in conjunction with a feedback circuit 212 and an isolation barrier crossing circuit 214. The resulting high voltage (HV), e.g., 300V, is used to power the HET anode 144 and the ignitor 143. More specifically, an output of the DC-DC converter 210 of the anode and ignitor supply subsystem 114 is provided to both ignitor switch 116 (which is used to provide the ignitor signal that is provided by the PPU 112 to the ignitor circuit 143 of the HET) and the LC oscillation filter 118 (which is used to provide the anode signal that is provided by the PPU 112 to the anode 144).

As part of the normal operations of the HET 142, when operated with a DC input voltage on the anode 144, the HET 142 will superimpose an AC current on top of the average DC current into the anode 144. The LC oscillation filter 118, which includes an inductor L2 and a capacitor C2, blocks the AC current from affecting the above described control circuitry of the DC-DC converter of the anode and ignitor supply subsystem 114.

Figure 6:
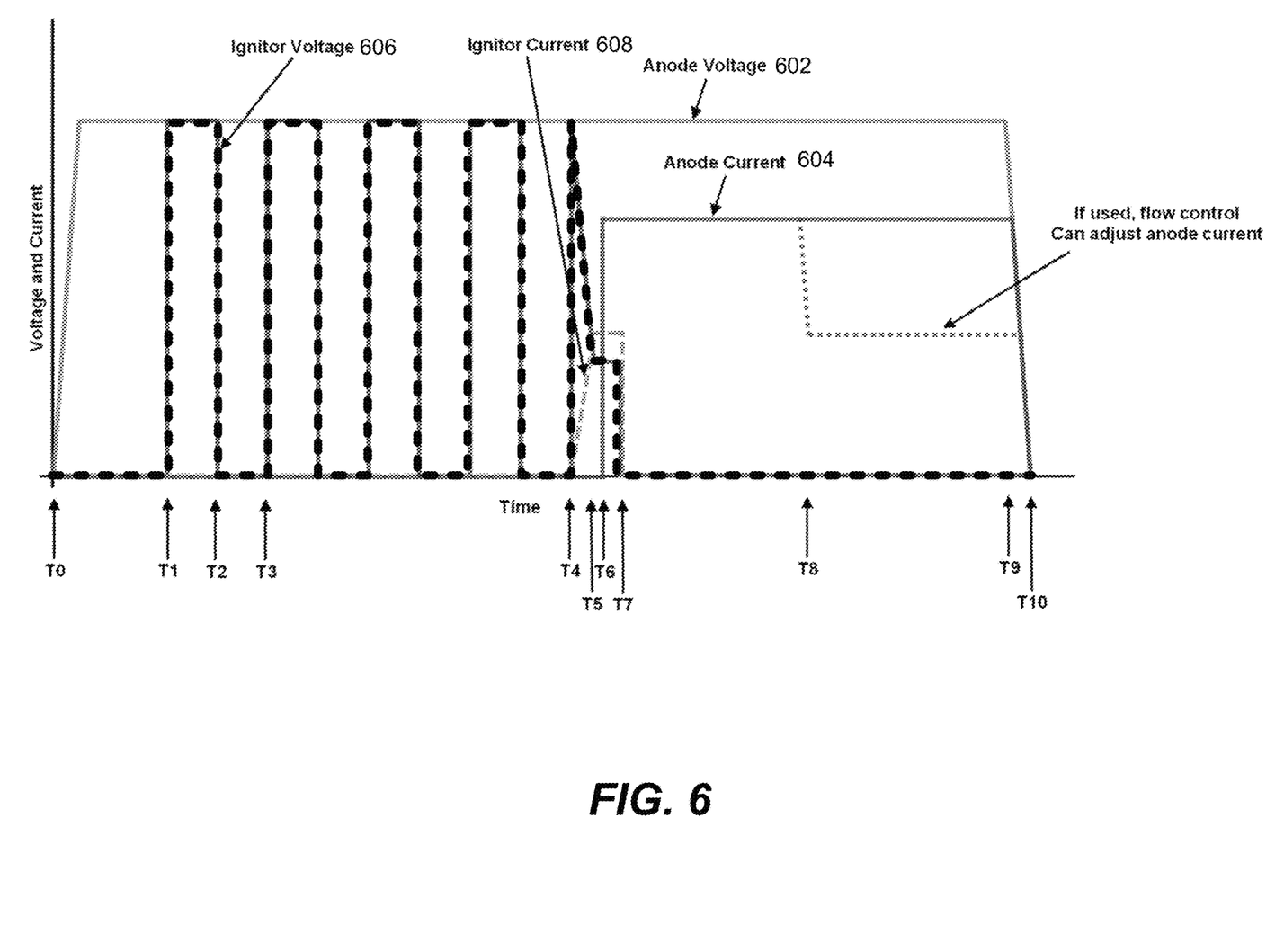
FIG. 6 is an example timing and waveform diagram that is used to illustrate example signals generated by the PPU introduced in FIG. 1, which are used to ignite and control the HET also introduced in FIG. 1.

Another feature provided by the depicted circuitry in FIG. 2 is the generation of high voltage ignitor pulses, examples of which are shown in FIG. 6 discussed below. In the embodiment shown in FIG. 2, the anode voltage is reused to supply the ignitor pulses on the Ignitor POS line 121. In other words, the high voltage produced by the output stage of the step-up DC-DC converter 210 is both used to produce the ignitor signal and the anode signal that is provided by the PPU 112 to the HET 142. The circuitry that is used to produce the ignitor signal is made up of a transistor switch M4 (shown as a MOSFET), an inductor L3, a power rectifier diode D4, a current sense resistor R1, a current limiting circuit 222, a gate driver circuit 226 and a pulse driver circuit 224. Together these elements work to directly provide the anode voltage to the HET ignitor 143 in the form of high voltage pulses. The transistor switch M4, the inductor L1 and the diode D4 form a simple buck-converter. The buck-converter, which is a type of step-down DC-DC converter, operates in two modes, including a voltage mode and a current mode. In the voltage mode, the transistor switch M4 is controlled by the pulse driver circuit 224 and is turned on and off at set intervals when an "Ignitor Enable" signal is set high. When an actual ignition occurs an ignitor current provided by the ignitor POS line 121 increases rapidly. If the ignitor current increases high enough the current limiting circuitry 222 will take control of the transistor switch M4 and reduce its duty cycle to maintain the current below a specified upper limit. In both the current and voltage modes, the gate driver 226 is used to control the transistor switch M4. When an ignition is detected, the "Ignitor Enable" signal is set low and the ignitor pulses terminate. The current limiting functionality of the current limiting circuit 222 is used to prevent the ignitor pulses from current limiting the HV power supply output. If the HV voltage power supply output is current limited then the high voltage (generated by the step-up DC-DC converter of the anode and ignitor supply subsystem 114) would begin to fall, which is undesirable, because if the high voltage is reduced below the required levels the HET 142 will not ignite. Explained another way, the current limiting circuit 222 prevents the anode voltage (i.e., the voltage of the anode signal) from dropping too low, which would prevent the HET 142 from igniting. In accordance with an embodiment, the "Ignitor Enable" signal is controlled by a microcontroller (aka microprocessor) of the command and telemetry subsystem 136 (in FIG. 1) of the PPU 112.

Figure 3:
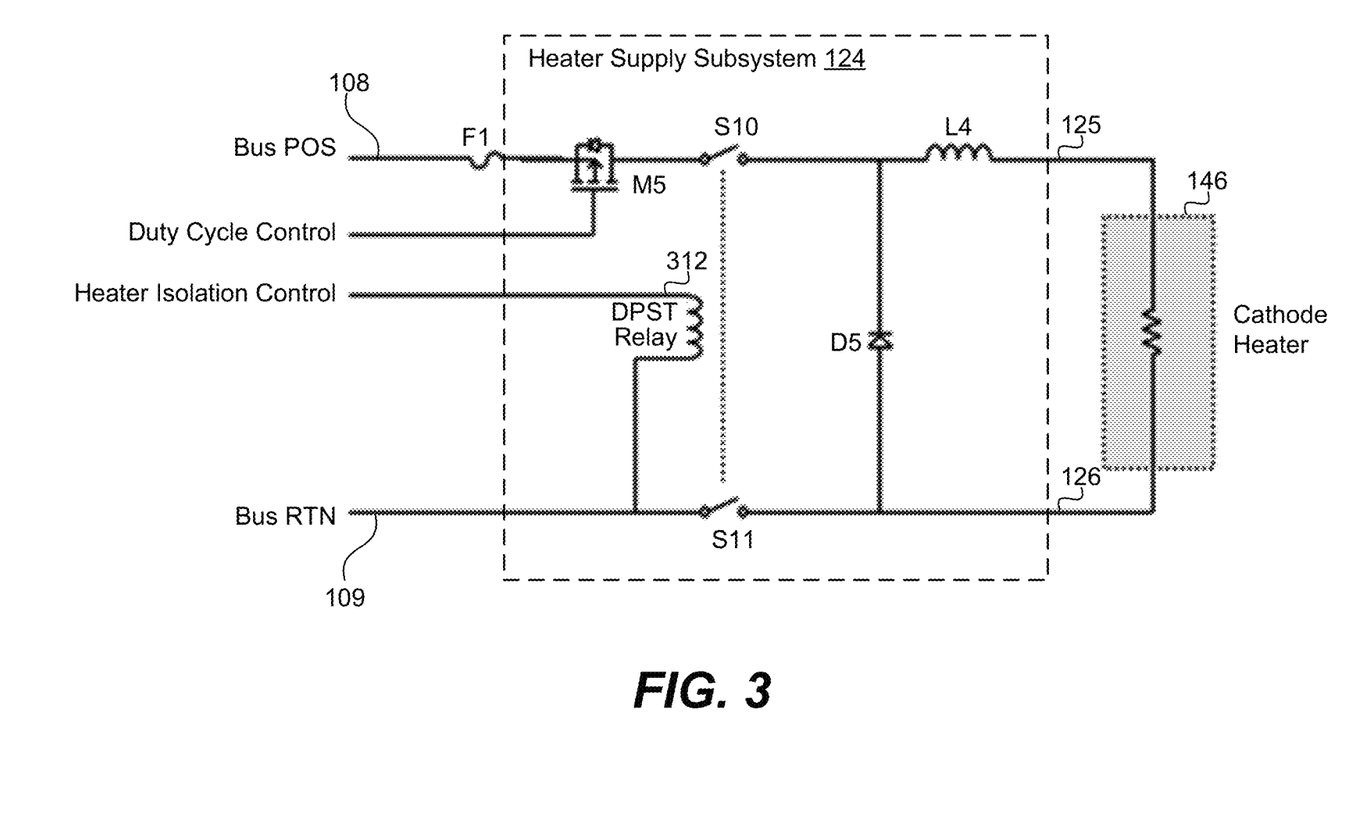
FIG. 3 shows details of the heater supply subsystem of the PPU introduced in FIG. 1, according to an embodiment of the present technology.

FIG. 3 shows details of the heater supply subsystem 124 of the PPU 112 introduced in FIG. 1, according to an embodiment of the present technology. The heater supply subsystem 124 can also be referred to as the heater supply module 124. Referring to FIG. 3, the heater supply subsystem 124 is shown as including a transistor switch M5, a pair of magnetic switches S10 and S11, a double pole single throw (DPST) relay 312 that is used to control the magnetic switches S10 and S11, a buck diode D5, and a smoothing inductor L4. A duty control signal is used to selectively open and close (i.e., turn on and off) the transistor switch M5 to selectively connect the bus POS line 108 to the cathode heater 146 through the smoothing inductor L4. A Heater Isolation Control signal is used to selectively control the DPST relay 312 so as to selectively isolate the bus POS line 108 and the bus RTN line 109 from the cathode heater 146. The transistor switch M5 (shown as a MOSFET), the inductor L4 and the diode D5 form the main power stage of a buck converter, which is a type of step-down DC-DC converter. The action of the transistor switch M5 (shown as a MOSFET) repeatedly opening and closing generates voltages pulses at the input of the inductor L4 that the inductor L4 then averages to generate a lesser voltage to feed to the cathode heater 146. The diode D5 allows current to continue flowing through the inductor L4 during periods of the switching cycle when the transistor switch M5 is in the open position. The duty cycle and frequency of the transistor switch M5 is controlled by the Duty Cycle Control signal. In this manner, the transistor switch M5, the inductor L4, and the diode D5 provide for current regulation. The Duty Cycle Control signal and the Heater Isolation Control signal, which are used to control the transistor switch M5 and the DPST relay 312, respectively, are provided by the command and telemetry subsystem 136 of the PPU 112, and more specifically, by a microcontroller (aka microprocessor) thereof. Beneficially, in the embodiment shown, the heater supply subsystem 124 does not require its own DC-DC converter having a respective transformer, but rather, is able to operate using the LV level of the bus POS line 108 of the LV bus 106 (or a stepped-down version thereof). To provide for a fault tolerant design, a fuse F1 will break in the case the cathode heater 146 fails and looks like a short circuit, to thereby prevent the heater supply subsystem 124 from inadvertently pulling too much current from the LV bus 106.

Figure 4:
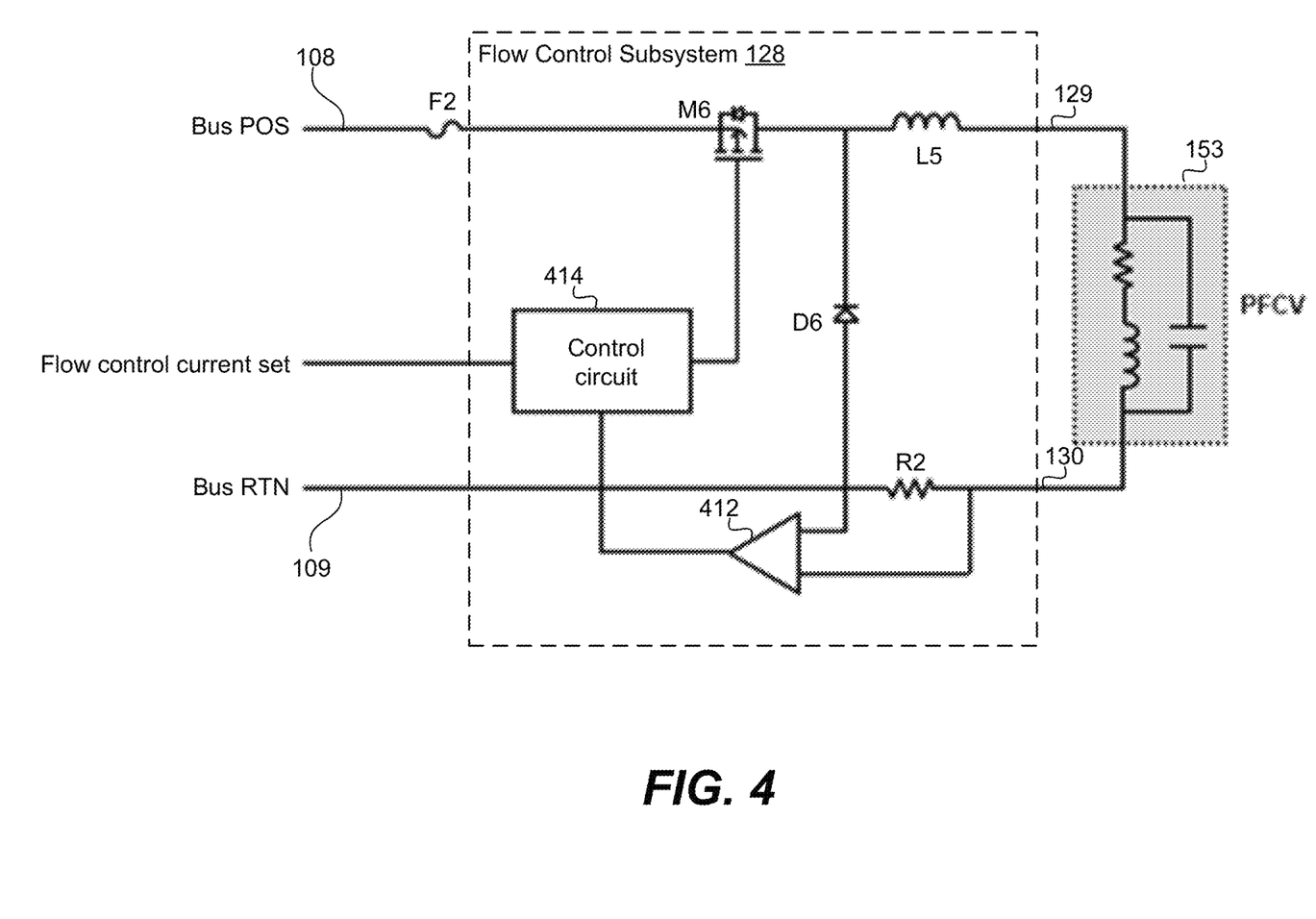
FIG. 4 shows details of the flow control subsystem of the PPU introduced in FIG. 1, according to an embodiment of the present technology.
Figure 5:
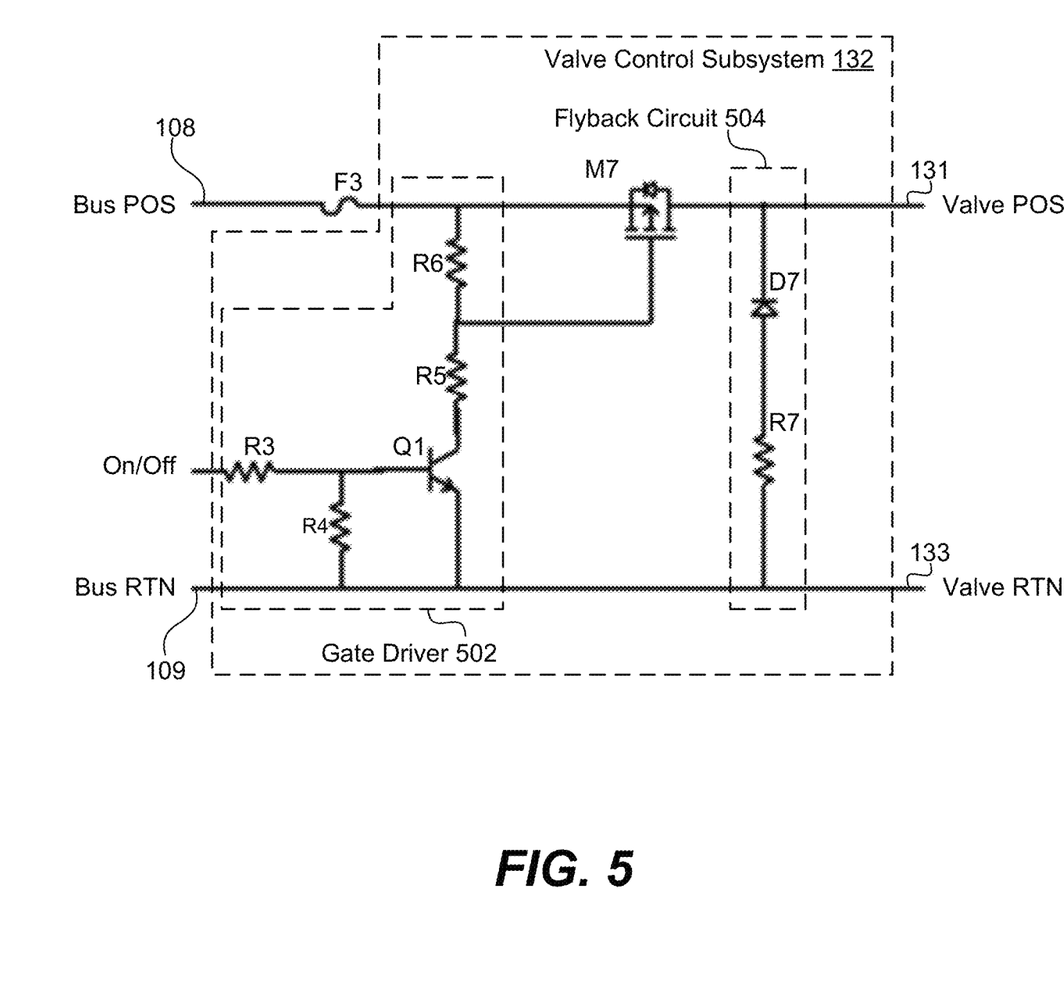
FIG. 5 shows details of the valve control subsystem of the PPU introduced in FIG. 1, according to an embodiment of the present technology.

FIG. 4 shows details of the flow control subsystem 128 of the PPU 112 introduced in FIG. 1, according to an embodiment of the present technology. Referring to FIG. 5, the flow control subsystem 128, which can also be referred to as the flow control module 128, is shown as including a transistor switch M6, an inductor L5, a diode D6, a control circuit 414, a current sense resistor R2, and an amplifier 412. The flow control subsystem 128 is used to control the flow control device 153, which in certain embodiments is a proportional flow control valve (PFCV), which is represented or modeled as a resistor in series with an inductor, which are collectively in parallel with a capacitor. The transistor switch M6 (shown as a MOSFET), the inductor L5 and the diode D6 form the main power stage of a buck converter, which is a type of step-down DC-DC converter. The action of the transistor switch M6 (shown as a MOSFET) repeatedly opening and closing generates voltages pulses at the input of the inductor L5 that the inductor L5 then averages to generate a lesser voltage to feed to the flow control device 153. The diode D6 allows current to continue flowing through the inductor L5 during periods of the switching cycle when the transistor switch M6 is in the open position. The duty cycle and frequency of the transistor switch M6 is controlled by a control circuit 414. In this manner, the control circuit 414, the transistor switch M6, the inductor L5, and the diode D6 provide for current regulation. A resistor R2 is used to monitor current through the flow control device 153 (e.g., the PFCV), and thus, the resistor R2 can be referred to as a current monitoring resistor R2. More specifically a voltage drop across the resistor R2, which voltage drop is proportional to the current through the resistor R2, is amplified by an amplifier 412, and provided to the control circuit 414. The control circuit 414 also receives a flow control current setting signal from the microcontroller (aka microprocessor) of the command and telemetry subsystem 136 of the PPU 112. The control circuit 414 also receives the output of the amplifier 412, which is indicative of the current monitored using the resistor R2, which as noted above, is indicative of the current through the flow control device 153. The duty cycle and frequency of the transistor switch M5 is controlled by the control circuit 414, which operates as an error amplifier (EA), in that it attempts to cause the current through the flow control device 153 to equal the current setting indicated by the flow control current setting signal. Beneficially, in the embodiment shown, the flow control subsystem 128 does not require its own DC-DC converter having a respective transformer, but rather, is able to operate using the LV level (or a stepped-down version thereof) of the bus POS line 108 of the LV bus 106. To provide for a fault tolerant design, a fuse F2 will break in the case the flow control device 153 fails and looks like a short circuit, to thereby prevent the flow control subsystem 128 from inadvertently pulling too much current from the LV bus 106.

FIG. 5 shows details of the valve control subsystem 132 of the PPU 112 introduced in FIG. 1, according to an embodiment of the present technology. Referring to FIG. 5, the valve control subsystem 132, which can also be referred to as the valve control module 132, is shown as including a gate driver 502, a transistor switch M7 (shown as a MOSFET), and a flyback circuit 504. The gate driver 502, which is shown as including resistors R3, R4, R5 and R6, and a bipolar junction transistor (BJT) Q1, receives an On/Off signal from the command and telemetry subsystem 136, and in response thereto, either turns on or turns off (i.e., closes or opens) the transistor switch M7, which in turn either opens or closes a respective one of the one or more valves 154 of the HET 142. The flyback circuit 504 allows the valve 154, which is being turned on and off (also known as opened and closed) by the transistor switch M7 to close quickly and to clamp the flyback voltage provided by the valve 154. Where the HET 142 includes multiple valves 154 (e.g., three valves 154a, 154b and 154c), which can be individually turned on and off, the valve control subsystem 132 can include multiple instances (e.g., three instances) of each the gate driver 502, the transistor switch M7, and the flyback circuit 504, to enable each of the multiple valves 154 to be individually controlled. While a specific implementation for the gate driver 502 is shown in FIG. 5, the use of alternative gate driver circuits are also possible and within the scope of the embodiments described herein. Beneficially, in the embodiment shown, the valve control subsystem 132 does not require its own DC-DC converter having a respective transformer, but rather, is able to operate using the LV level of the bus POS line 108 (or a stepped-down version thereof) of the LV bus 106. To provide for a fault tolerant design, a fuse F3 will break in the case a valve fails and looks like a short circuit, to thereby prevent the valve control subsystem 132 from inadvertently pulling too much current from the LV bus 106.

FIG. 6 is an example timing and waveform diagram that is used to illustrate example signals generated by the PPU 112, which signals are used to ignite and control the HET 142 and the PMA 152. Referring to FIG. 6, shown therein is an anode voltage 602, an anode current 604, an ignitor voltage 606, and an ignitor current 608. The anode voltage 602 is the voltage between the anode POS line 122 and the RTN line 123. The ignitor voltage 606 is the voltage between the ignitor POS line 121 and the RTN line 123. The anode voltage 602 and the anode current 604 are characteristics of an anode signal provided by the PPU 112 to the HET 142. The ignitor voltage 606 and the ignitor current 608 are characteristics of the ignitor signal provided by the PPU 112 to the HET 142.

Still referring to FIG. 6, at a time T0, when the PPU 112 is enabled, the anode voltage 602 begins to rise, and the anode current 604 remains at 0 Amps (A) from the time T0 until (a time T6) after the HET 142 is ignited. That is, the anode current 604 remains at 0 A when the HET 142 is not ignited. The ignitor voltage remains at 0 Volts (V) from the time T0 to the time T1, since during that period the Ignitor Enable signal (in FIG. 2) is set to a logic low state. From the time T0 to the time T1, the ignitor current 608 remains at 0 A since the ignitor voltage 606 is at 0 V during that time period.

At the time T1 the PPU logic detects that the anode voltage 602 is at the correct value that can be used to power the HET ignitor 143, and the Ignitor Enable signal (in FIG. 2) is changed to a logic high state, enabling ignitor voltage pulses, which causes the ignitor voltage 606 to rise to the anode voltage 602, as shown in FIG. 6. Ignition of the HET 142 may not occur right away in response to the first ignitor voltage pulse (which is present between the times T1 and T2), but rather, a few ignitor voltage pulses may be required to ignite the HET 142. At the time T2 in FIG. 6, ignition of the HET 142 has not yet been detected, the anode current remains at 0 A, and the first ignitor pulse is terminated. At a time T3 the next ignitor pulse is enabled, and a pulse train of ignitor voltage pulses continues until ignition of the HET 142 is detected. In certain embodiments, ignition of the HET 142 is detected in response to the anode current being greater than 0 A, or some other specified anode current threshold.

At a time T4 the HET 142 begins to ignite due to one of the ignitor voltage pulses. The ignitor voltage 606 may rise all the way to the anode voltage 602, but is not guaranteed to, because ignition of the HET 142 may occur at a lower ignitor voltage. At the time T4 the ignitor current 608 begins to rise, wherein the ignitor current 608 may be limited by the HET ignitor circuit 143. At a time T5 the ignitor current 608 may be limited by the HET ignitor circuit 143 until the anode current 694 begins to rise. At a time T6 the current flowing out of the HET ignitor circuit 143 has ignited the HET plasma and the anode current 604 begins to flow in the HET anode 144. Additionally, at the time T6 the anode current 604 begins to rise.

At a time T7 the HET ignition has been detected and the ignitor pulses are terminated in response to the Ignitor Enable signal (in FIG. 2) being changed to a logic low state. The ignitor voltage 606 and the ignitor current 608 remains, respectively, 0 V and 0 A until the PPU 112 is enabled again. At a time T8, if flow rate control is present, the HET anode current 604, and thus power, can be varied. At a time T9 the PPU 112 is commanded off and the anode voltage 602 and the anode current 604 begin to fall. At a time T10 the anode voltage 602 and the anode current 604 are, respectively, at 0 V and 0 A, at which point the PPU 112 is now fully disabled.

In accordance with certain embodiments of the present technology, a universal and simplified PPU 112 is provided that can be used with various different models of HETs and PMAs. One benefit of such embodiments is that a satellite manufacturer that includes such a PPU on their spacecrafts is not limited to a single source for its HET nor a single source for its PMA. In other words, with a PPU of the present technology a satellite manufacturer is not locked into purchasing a specific type of HET and/or a specific type of PMA from specific vendors. Another benefit is that such a PPU could be used with an HET and PMA that are designed and manufactured after the PPU has already been designed and manufactured. More generally, a PPU of the present technology can beneficially be used on various different types and models of spacecraft, and can be used with various different types and models of HETs and PMAs, providing for improved flexibility compared to conventional PPUs.

In accordance with certain embodiments, the PPU 112 can be enabled and operated by a simple ON/OFF command with no need to provide set point commands prior to every operation.

In accordance with certain embodiments, the PPU 112 includes a single printed wiring board (PWB) that provides for all power conversion, control and communication circuitry, which reduces total production costs and schedule, supporting a high production rate.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention. For example, it would be possible to combine or separate some of the steps described above.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the above detailed description of the present subject matter, numerous specific details are set forth in order to provide a thorough understanding of the present subject matter. However, it will be clear to those of ordinary skill in the art that the present subject matter may be practiced without such specific details.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

What is claimed is:

1. A power processing unit (PPU) configured for use with a Hall Effect Thruster (HET) and a Propellant Management Assembly (PMA) of a spacecraft, wherein the HET is configured to propel the spacecraft using a propellant provided to the HET by the PMA, the PPU comprising:
   an anode and ignitor supply subsystem configured to provide an anode signal and an ignitor signal, respectively, to an anode and an ignitor circuit of the HET; and
   a valve control subsystem configured to provide one or more valve control signals to one or move valves of the PMA;
   wherein each of the anode and ignitor supply subsystem and the valve control subsystem of the PPU is configured to be coupled to a low voltage (LV) bus of an electrical power subsystem of the spacecraft;
   wherein the anode and ignitor supply subsystem includes a step-up direct current to direct current (DC-DC) converter having a transformer that steps-up a voltage of the LV bus to a higher voltage that is used to produce the anode signal and the ignitor signal that are configured to be provided, respectively, to the anode and the ignitor circuit of the HET; and
   wherein the valve control subsystem is devoid of any transformer.

2. The PPU of claim 1, wherein:
   a voltage produced at an output of the step-up DC-DC converter of the anode and ignitor supply subsystem is used to produce both the ignitor signal and the anode signal that are configured to be provided, respectively, to the ignitor circuit and the anode of the HET.

3. The PPU of claim 2, wherein:
   the ignitor signal includes a plurality of ignitor pulses that are configured to be used to ignite the HET; and
   a voltage of each of the ignitor pulses of the ignitor signal is is equal to a voltage of the anode signal.

4. The PPU of claim 3, wherein:
   the anode and ignitor supply subsystem includes an ignitor switch that receives the voltage produced at the output of the step-up DC-DC converter of the anode and ignitor supply subsystem and produces the ignitor pulses therefrom.

5. The PPU of claim 4, wherein:
   the ignitor switch includes a current limiting circuit that is configured to maintain a current of the ignitor signal below a specified upper limit.

6. The PPU of claim 1, further comprising:
   a command and telemetry subsystem configured to receive commands from a processor of the spacecraft, and in response thereto control the anode and ignitor supply subsystem and the valve control subsystem of the PPU.

7. The PPU of claim 1, further comprising:
   a flow control subsystem configured to provide a flow control signal to a flow control device of the PMA;
   wherein the flow control subsystem includes a step-down DC-DC converter that steps-down the voltage of the LV bus to a lower voltage that is used to produce the flow control signal that is configured to be provided to the flow control device of the PMA; and
   wherein the step-down DC-DC converter of the flow control subsystem is devoid of any transformer.

8. The PPU of claim 7, further comprising:
   a command and telemetry subsystem configured to receive commands from a processor of the spacecraft, and in response thereto control the anode and ignitor supply subsystem, the valve control subsystem and the flow control subsystem of the PPU.

9. The PPU of claim 1, further comprising:
   a heater supply subsystem configured to provide a heater control signal to a heater of the HET that is configured to heat a cathode of the HET;
   wherein the heater supply subsystem is configured to be coupled to the LV bus of the spacecraft electrical power subsystem; and
   wherein the heater supply subsystem is devoid of any transformer.

10. The PPU of claim 9, wherein:
    the heater supply subsystem includes one or more magnetic switches and one or more relays that enable the heater of the HET to be selectively electrically isolated from the LV bus of the spacecraft electrical power subsystem without use of any transformer.

11. The PPU of claim 10, further comprising:
    a command and telemetry subsystem configured to be coupled to a processor of the spacecraft, to receive commands from the processor of the spacecraft, and in response thereto control the anode and ignitor supply subsystem, the valve control subsystem, and the heater supply subsystem of the PPU.

12. The PPU of claim 1, further comprising:
    a housekeeping power supply subsystem configured to power electrical components of the PPU;
    wherein the housekeeping power supply subsystem is configured to be coupled to the LV bus of the spacecraft electrical power subsystem; and
    wherein the housekeeping power supply subsystem does not provide any signals to the HET and the PMA.

13. An electric propulsion system (EPS) for inclusion on a spacecraft, the EPS comprising:
    a Power Processing Unit (PPU) configured to be coupled to a low voltage (LV) bus of an electrical power subsystem of the spacecraft, the PPU comprising an anode and ignitor supply subsystem and a valve control subsystem, the anode and ignitor supply subsystem including a step-up DC-DC converter having a respective transformer that is used to produce both an anode signal and an ignitor signal that are output by the PPU, the valve control subsystem devoid of any transformer and configured to produce one or more valve control signals that are output by the PPU;
    a Hall Effect Thruster (HET) comprising an anode and an ignitor circuit that receive, respectively, the anode signal and the ignitor signal from the PPU, which are used to selectively ignite the HET; and
    a Propellant Management Assembly (PMA) including one or more valves each of which receives a respective one of the one or more valve control signals from the PPU, which are used to selectively open and close the one or more valves to thereby selectively provide propellant to the HET;

wherein components of the HET and the PMA, other than the anode and the ignitor circuit of the HET, are configured to operate at a voltage of the LV bus or one or more stepped-down versions thereof.

14. The EPS of claim 13, wherein:

a voltage produced at an output of the step-up DC-DC converter of the anode and ignitor supply subsystem is used to produce both the ignitor signal and the anode signal that are provided, respectively, to the ignitor circuit and the anode of the HET.

15. The EPS of claim 14, wherein:

the ignitor signal includes a plurality of ignitor pulses that are used to ignite the HET; and a voltage of each of the ignitor pulses of the ignitor signal is equal to a voltage of the anode signal.

16. The EPS of claim 15, wherein:

the anode and ignitor supply subsystem includes an ignitor switch that receives the voltage produced at the output of the step-up DC-DC converter of the anode and ignitor supply subsystem and produces the ignitor pulses therefrom.

17. The EPS of claim 16, wherein:

the ignitor switch includes a current limiting circuit that is configured to maintain a current of the ignitor signal below a specified upper limit.

18. A power processing unit (PPU) configured for use with a Hall Effect Thruster (HET) and a Propellant Management Assembly (PMA) of a spacecraft, wherein the HET is configured to propel the spacecraft using a propellant provided to the HET by the PMA, the PPU comprising:

an anode and ignitor supply subsystem configured to provide an anode signal and an ignitor signal, respectively, to an anode and an ignitor circuit of the HET;

a heater supply subsystem configured to provide a heater control signal to a heater of the HET that is configured to heat a cathode of the HET;

a valve control subsystem configured to provide one or more valve control signals to one or move valves of the PMA; and a flow control subsystem configured to provide a flow control signal to a flow control device of the PMA;

wherein each of the anode and ignitor supply subsystem, the valve control subsystem, the flow control subsystem and the heater supply subsystem of the PPU is configured to be coupled to a low voltage (LV) bus of an electrical power subsystem of the spacecraft;

wherein the anode and ignitor supply subsystem includes a step-up direct current to direct current (DC-DC) converter having a transformer that steps-up a voltage of the LV bus to a higher voltage that is used to produce the anode signal and the ignitor signal that are provided, respectively, to the anode and the ignitor circuit of the HET; and wherein the valve control subsystem, the flow control subsystem and the heater supply subsystem are each devoid of any transformer.

19. The PPU of claim 18, wherein:

each of the valve control subsystem, the flow control subsystem and the heater supply subsystem is configured to produce one or more output signals that is provided to the HET or the PMA and have the voltage of the LV bus or a stepped-down version thereof.

20. The PPU of claim 19, wherein:

a voltage produced at an output of the step-up DC-DC converter of the anode and ignitor supply subsystem is used to produce both the ignitor signal and the anode signal that are provided, respectively, to the ignitor circuit and the anode of the HET; and the anode and ignitor supply subsystem includes an ignitor switch that receives the voltage produced at the output of the step-up DC-DC converter of the anode and ignitor supply subsystem and produces ignitor pulses of the ignitor signal therefrom.

* * * * *

UNITED STATES PATENT AND TRADEMARK OFFICE
CERTIFICATE OF CORRECTION

PATENT NO. : 11,649,072 B1
APPLICATION NO. : 17/737432
DATED : May 16, 2023
INVENTOR(S) : J. Esquivias et al.

It is certified that error appears in the above-identified patent and that said Letters Patent is hereby corrected as shown below:

In the Claims

Column 15, Line 51 (Claim 3, Line 5), please change "is is" to -- is --.

Signed and Sealed this
Seventeenth Day of October, 2023

Katherine Kelly Vidal
*Director of the United States Patent and Trademark Office*